No. 650,314. Patented May 22, 1900.
C. H. GEIMER.
LIQUID HEATER FOR TABLE USE.
(Application filed Feb. 3, 1900.)
(No Model.)

Witnesses:
Inventor
Cecilia H. Geimer,

UNITED STATES PATENT OFFICE.

CECELIA H. GEIMER, OF WASHINGTON, DISTRICT OF COLUMBIA.

LIQUID-HEATER FOR TABLE USE.

SPECIFICATION forming part of Letters Patent No. 650,314, dated May 22, 1900.

Application filed February 3, 1900. Serial No. 3,889. (No model.)

*To all whom it may concern:*

Be it known that I, CECELIA H. GEIMER, of the city of Washington, in the District of Columbia, have invented certain new and useful Improvements in Liquid-Heaters for Table Use, of which the following is a specification, reference being had to the accompanying drawings and to the numerals of reference marked thereon.

This invention relates more particularly to a heater to be used upon a dining-table or elsewhere for keeping coffee, tea, chocolate, or other liquids heated, and is designed to present a simple and attractive device for this purpose by the use of which the liquid may be kept at a proper temperature without danger of being raised to the boiling-point.

Figure 1:
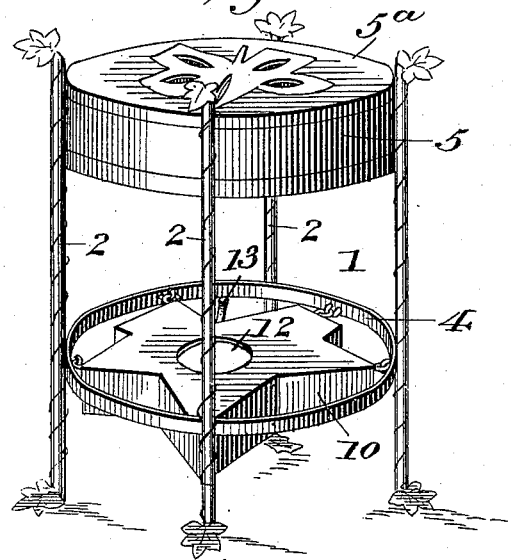
Figure 2:
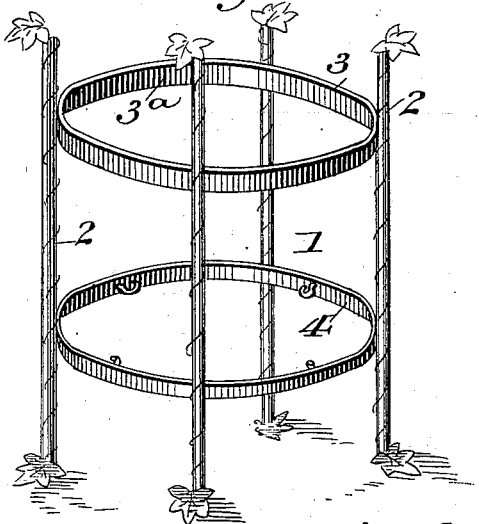
Figure 3:
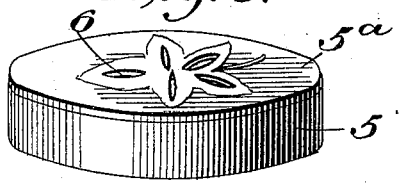
Figure 5:
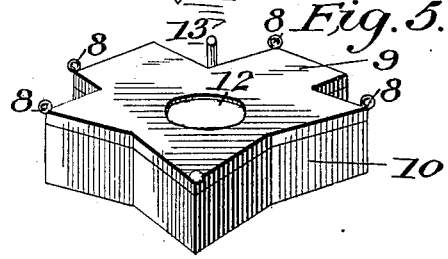
Figures 4, 7:
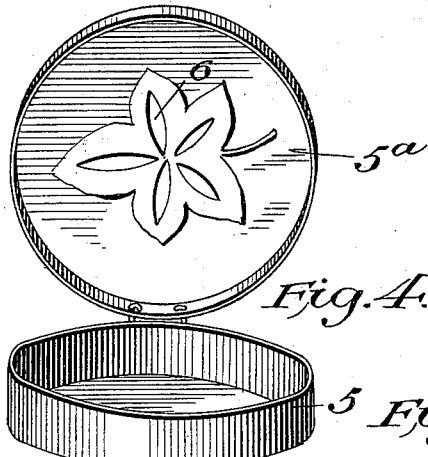
Figure 6:
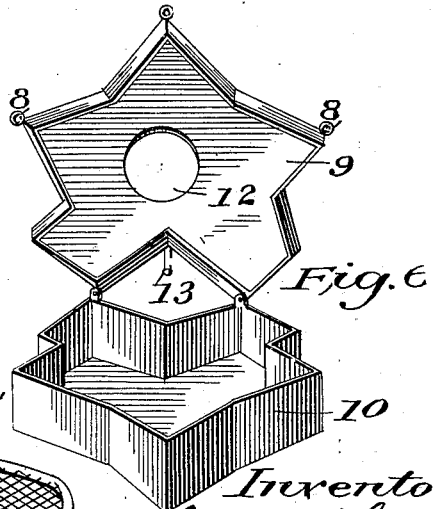

In the accompanying drawings, Figure 1 is a perspective view of the heater complete, except that the lamp, which may be of any ordinary kind, is not shown. Fig. 2 is a perspective view of the frame alone. Fig. 3 shows in perspective the water vessel or tank upon which the coffee-pot or other vessel containing the liquid to be heated rests. Fig. 4 shows the water vessel with its lid lifted. Fig. 5 is a perspective view of the lamp-case. Fig. 6 is a perspective view of the lamp-case with its lid lifted. Fig. 7 shows a detail of the invention.

Similar numerals of reference indicate similar parts in the respective figures.

1 may represent the frame generally, which as here shown consists of four posts or standards 2, connected by an upper ring 3 and a lower ring 4. The posts or standards are made of any pleasing design and as here illustrated are ornamented with representations of ivy-leaves with the tendrils or stems twined about the standards and connected with the leaves at the respective ends. Fitted within or sustained by the upper ring 3 is a water vessel 5. (Shown in position in Fig. 1 and detached in Figs. 3 and 4.) In the latter figure it will be seen that the water vessel 5 consists of a receptacle for the water and a lid 5ª. The latter, as shown in Fig. 4, is detachable from the vessel, but it may be hinged thereto, if desired. In Fig. 3 the lid 5ª is perforated in any suitable manner; but as here shown the perforations are represented by 6, they forming a part of an ornamental configuration upon the lid indicating a leaf. It is obvious that the perforations may be distributed in any manner and of any shape.

The upper ring 3 is provided with a ledge 3ª, upon which the base of the vessel 5 rests. The lower ring 4 is furnished with internal hooks 7, to which are attached the rings 8 of the lid 9 of the lamp-case 10. (Shown particularly in Figs. 5 and 6.) The latter figure shows the lid open, it being hinged to the case at 11. The lid has a central opening 12, through which the wick-tube of the lamp, held within the case, projects into sufficiently close proximity to the under side of the water vessel 5 as to allow the flame from the lamp to heat the water within the vessel. From the lid 9 of the lamp-case 10 extends a handle or finger-piece 13, and by pressure upon it the lid 9 may be tilted on its hinge 11 and opened, as shown in Fig. 6. The lamp-case 10 and its lid are also, by preference, shown in the form of a leaf, but it is obvious that other shapes may be adopted. While the lamp-case is made to be detachably connected with the ring 4 by means of hooks and rings, it is evident that other modes of detachable connection may be used.

Fig. 7 shows a wire-netting inclosed by a ring 14 and adapted to be used in place of the vessel 5 when water is to be boiled. Upon the wire-netting a kettle or other receptacle may be placed and water heated to the boiling-point.

By means of my invention a simple and attractive device is furnished for table use, whereby the liquid—such as coffee, chocolate, or the like—may be kept to the proper temperature by the steam escaping through the apertures of the lid 5ª or radiated heat without the liability of the flavor of the coffee, &c., being impaired or losing its aroma due to boiling.

Having thus described my invention, I claim—

1. In a heater, the combination of a frame, a water vessel having a lid provided with perforations, and a removable lamp-case, substantially as set forth.

2. In a heater, the combination, substantially as specified, of a frame provided with supports for a water vessel and a lamp-case, respectively, a water vessel furnished with a perforated lid, and a removable lamp-case, the whole arranged as described for the purpose set forth.

3. In a heater, the combination, substantially as specified, of a frame provided with supports for a water vessel and a lamp-case, respectively, a water vessel furnished with a perforated lid, and a removable lamp-case having a hinged perforated top, the whole arranged as described for the purpose set forth.

In testimony whereof I hereunto set my hand and seal.

CECELIA H. GEIMER. [L. S.]

In presence of—
 EDWIN S. CLARKSON,
 C. B. BULL.